Nov. 4, 1941.   J. E. HAINES   2,261,582
CONDITION CONTROLLER
Filed Nov. 2, 1936
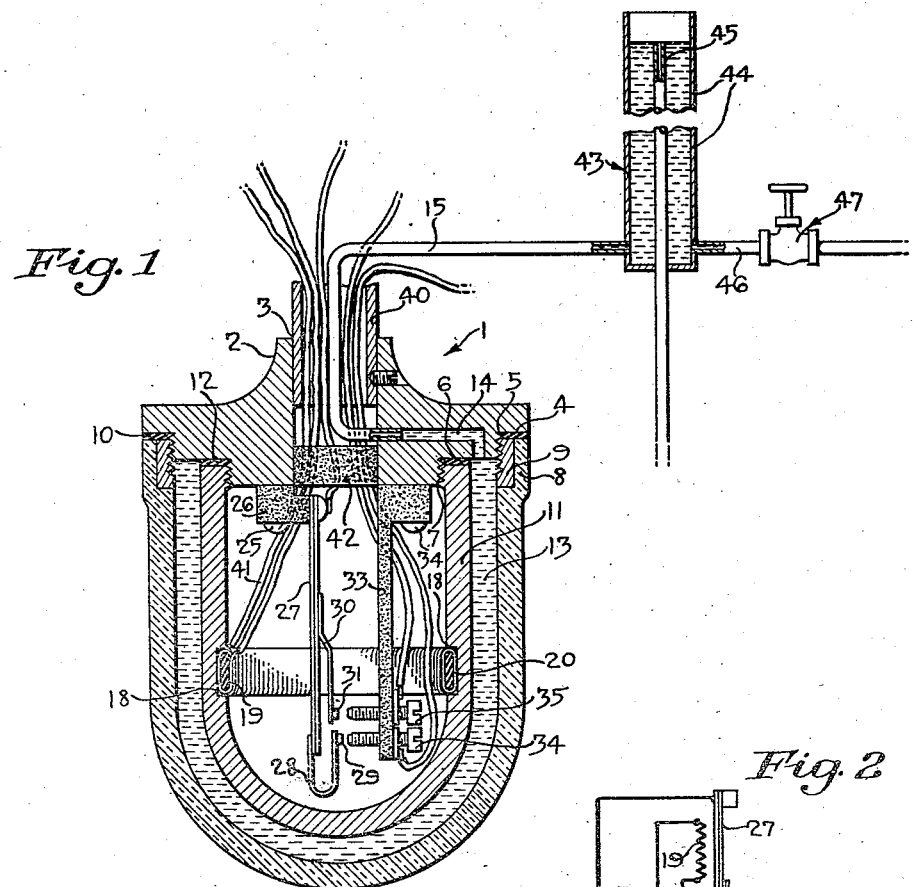
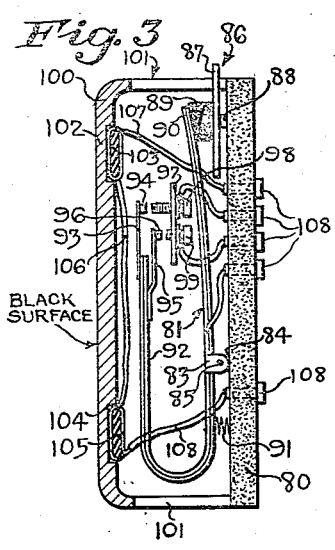
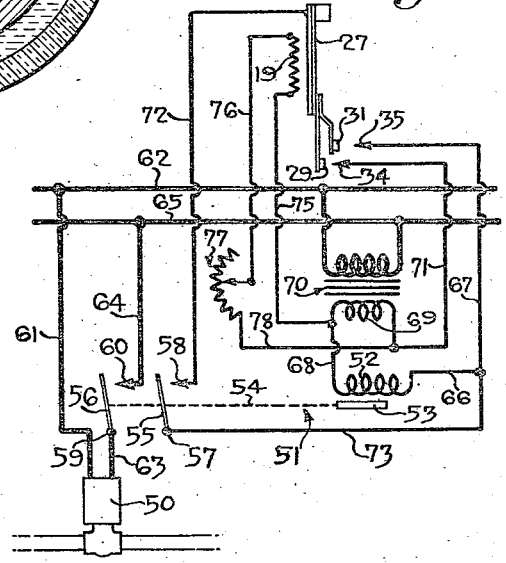
Inventor
John E. Haines
By George H. Fisher
Attorney Patented Nov. 4, 1941

2,261,582

UNITED STATES PATENT OFFICE 2,261,582

CONDITION CONTROLLER

John E. Haines, Minneapolis, Minn., assignor to Minneapolis-Honeywell Regulator Company, Minneapolis, Minn., a corporation of Delaware Application November 2, 1936, Serial No. 108,750

3 Claims. (Cl. 236—68)

The present invention relates to condition controlling devices, and more particularly to devices for controlling the temperature or humidity of spaces occupied by human beings in order to maintain comfortable conditions therein.

Heretofore, it has been customary to merely maintain a constant dry bulb temperature in rooms or spaces occupied by human beings, this temperature being maintained constant regardless of other conditions such as humidity, air currents, and the temperature of the walls of the room. This method of control, while being somewhat satisfactory, at times causes the occupants to experience a somewhat chilly sensation, while at other times to feel too warm. The reasons for this is that dry bulb temperature is not the sole factor affecting the comfort of the occupants.

As is well known, heat is constantly generated within the human body, and must constantly be dissipated therefrom. This heat is dissipated by radiation, by conduction, and by the evaporation of moisture on the skin. If the conditions within the space are such that the dissipation of heat from the human body would be rapid, the temperature controlling glands of the body itself would act to compensate for such condition, but nevertheless, the person would feel chilly. Conversely, if the conditions within the space are such that heat dissipation from the body would be slow, perspiration would increase and the person would feel warm and uncomfortable. If, however, the conditions within the room are such that the proper dissipation of heat from the body is obtained without the necessity of the temperature controlling organs of the body functioning to a great extent one way or the other, the person will feel very comfortable. In other words, a comfortable space condition is one in which the normal dissipation of heat from the human body is obtained without substantial effort on the part of the body temperature controlling system.

While the rate of dissipation of heat from the human body is affected primarily by the temperature of the surrounding air, it is also appreciably affected by other conditions such as relative humidity, air currents, and the temperature of the walls or other physical objects within the enclosure. If the relative humidity is low, evaporation of moisture from the skin will be increased, thus causing the occupants to feel chilly even though the temperature of the surrounding air is above 70° F. Similarly, if the relative humidity is high, evaporation of moisture from the skin will be decreased, thus resulting in a decrease in heat dissipation, which causes the occupants to feel too warm.

Air currents also affect the rate of heat dissipation from the body. Due to a drafty condition, the increased air flow across the body causes an increase in the rate of evaporation of moisture from the skin, and further increases the heat loss due to conduction or connection. Thus a drafty condition would cause the occupants to feel chilly, even though the temperature of the air is not low. Conversely, with extremely still air, the heat loss is reduced, and may cause the occupants to feel warm even though the air temperature is not excessive.

The temperature of the walls and objects within the room also affects the rate of heat dissipation from the human body and consequently affects human comfort. As heat will be transferred by radiation from a body of higher temperature to a body of lower temperature, heat is always radiated from the human body to the walls and to physical objects within the room if such objects are lower in temperature than body temperature. The rate of heat transfer of course is dependent upon the difference in temperature. Hence in cold weather when the walls are relatively cold, the heat dissipation from the human body is increased, thereby causing the occupants to feel chilly, even though the temperature may be above 70° F. Conversely, if the walls are heated either artificially as by panel heating in winter, or by warm weather, the radiation of heat from the occupants would decrease, or heat may even be radiated to the occupants thus causing them to feel too warm even though the room temperature may be relatively low. It also is common for heat to be radiated from the body to the walls and objects within the enclosure, while at the same time, heat is being radiated to the body from a warmer object such, for instance, as a stove or radiator. The effect of radiation on the comfort of the occupants would thus be the resultant of these two actions.

From the foregoing it is apparent that in order to maintain a space at a condition of maximum comfort, it is necessary to take into consideration the temperature, humidity, and air currents in the space occupied, and also what may be termed as the resultant radiation to or from the occupants. It should also be apparent that comfort conditions may be maintained in a space without maintaining any of the above mentioned factors constant, and that by changing the value of any one factor, the condition of the space may be brought into or taken out of the comfort zone. What may be termed the index of comfort is thus the resultant on human comfort of the four factors enumerated.

The primary object of my invention, therefore, is to provide a control device which is affected by temperature, humidity, and air currents within the room, and which is further affected by the temperature of the walls and objects within the enclosure.

More specifically, it is an object of my invention to provide a control device which imitates, as nearly as possible, the heat loss from the human body, and which is adapted to control one or more of the various factors above mentioned in order to maintain the space in a comfortable condition.

A further object is to provide a condition controlling or measuring device which directly measures the index of comfort of a space.

Another object is to provide a condition controller which is affected not only by the temperature surrounding the controller, but also by the temperature of other objects in the space in which the controller is located.

Other objects will appear as this description proceeds.

For a complete description of my invention reference is made to the accompanying drawing, in which:

Figure 1 is an elevation partly in section of a preferred form of a condition responsive device;

Figure 2 is a wiring diagram indicating the connections of the device of Figure 1 with a condition controlling system; and Figure 3 is a sectional elevation of a different form of thermostat embodying one of the features of my invention.

Reference character 1 indicates a circular base member. This base member is provided with an upstanding boss 2 having therein an aperture 3 which extends through to the opposite side of the base member. Member 1 is shaped with a stepped lower surface providing an outer shoulder 5 and an annular surface 4 at right angles thereto, a second shoulder 7, and a cooperating annular surface 6 at right angles thereto. The surface 5 is screw threaded to cooperate with the threads of a ring 9 which is secured to a dome shaped outer jacket 8 which is formed of a porous material such as Alundum. Between the surface 5 and the upper edge of porous jacket 8 is inserted a gasket 10 which may be of soft rubber or other suitable material. The surface 7 is screw threaded to receive a dome shaped inner jacket 11 which is formed of a heat conducting material. A gasket 12 is interposed between the end of this member and the shoulder 6, thereby forming a water tight connection. As shown the jacket 8 is spaced from the member 11 thereby providing a space 13 which is adapted to receive water through a passage 14 leading through the base member 1 to the aperture 3, the end of said passage being secured to a water supplying tube 15.

The inner surface of the member 11 is recessed at 18 to receive an annular shaped heating element 19. Heating element 19 may be of any desired form, and is herein shown as comprising a resistance coil wound around a core 20. This heating element should be secured to the member 11 by means of a heat conducting cement so that the heat from the coil flows directly into the member 11 thereby causing member 11 to become heated. The member 11 is shown as having sufficient mass to cause substantial conduction of heat therethrough, thereby causing it to be substantially equally heated throughout even though the heating element is localized. It will be observed that the heating element is located substantially equi-distant between the ends of member 11 and contacts the entire inner circumference of said member, thereby causing substantial equalized distribution of heat to the extremities of said member.

Mounted upon base member 1 adjacent aperture 3 is an L shaped supporting element 26, this member being secured to the base member 1 by means of a screw 25. Attached to the other leg of member 26 is a bimetallic element 27 which extends downwardly. To the lower end of the bimetallic element 27 is attached a flexible contact blade 28 carrying a contact 29. Between the ends of the bimetallic element 27 is attached a relatively stiff contact blade 30 which carries a contact 31. Attached to the base member 1 and facing the bimetallic element 27 is an L shaped contact carrying arm 33 which is formed of insulating material and which is secured to the base member 1 by means of a screw 34. Member 33 at its other extremity carries an adjustable contact point 34 cooperating with the contact 29, and a second adjustable contact 35 which cooperates with the contact 31. The bimetallic element 27, it will be seen, is completely surrounded by the element 11 which forms a mass of heat conducting material. Bimetallic element 27 is responsive to only the temperature of the mass of element 11. Should the mass temperature be higher than the temperature of the bimetallic element 27, heat will be radiated from the former to the latter until the mass and the thermostatic element are of the same temperature. Conversely, should the temperature of the thermostatic element 27 be higher than that of mass 11 radiation of heat from the former to the latter will occur until the thermostatic element and mass are again of equal temperature. By this action the thermostatic element 27 responds solely to the temperature of the mass 11. The heating element will not materially affect the thermostatic element 27 due to the fact that this element is in good heat conducting relationship with the mass of material 11. It is to be understood that this element will not be intensely heated but is to be heated just sufficiently to cause the desired input of heat into the mass 11. If desired, the interior surface of the heating element may be covered with an insulating material in order to prevent any possibility of its affecting the thermostatic element 27. Thermostatic element 27 may be arranged to move towards the right upon a decrease in temperature and the contact points 35 and 39 may be adjusted so that contacts 39 and 29 are engaged first and upon a further fall in temperature the contact points 31 and 35 will engage.

The device as a whole is intended to be located in a position within the room wherein it will be subjected to the air currents within the room and wherein it may receive or admit heat by radiation from or to surrounding objects in the room. For this purpose I prefer to locate the device in about the center of the room, and may hang it from the ceiling by means of a pipe or conduit 40 which is inserted into the aperture 3 of the base member 1. Conduit 40 is to be fixed in any suitable manner to the ceiling of the space in which the control device is located. The various leads 41 for the heating element, thermostatic element, and contact points may be led through the conduit 40 along with the water supplying tube 15. If desired, a plug 42 of insulating material may be placed within aperture 3 to prevent escape of heat from the interior of the mass element 11 into the conduit 40.

In order to maintain a constant head of water in the space 13 I provide a constant water level device 43 which is connected to the water supplying pipe 15. The constant water level maintaining device may comprise an open ended tube 44 having therein an overflow pipe 45 leading to any suitable drain. Water is supplied to the tube 44 by means of a supply pipe 46 having therein a needle valve 47. By adjusting valve 47 to maintain a slight overflow of water over the end of overflow pipe 45 the level of water in chamber 44 may constantly be maintained at a level equal to the height of overflow tube 45. In this manner a constant supply of water at a constant pressure is maintained for the control device.

In Figure 2 I have shown the wiring connections between the thermostat and a condition controlling device which, in this case may be a gas valve 50. Gas valve 50 is of the type which opens when energized and which closes upon deenergization thereof. This valve is controlled by means of a relay generally indicated at 51. Relay 51 comprises a coil 52 and an armature 53 disposed in the electrical field of the coil 52. Armature 53 is pivotally connected by a link 54 to a pair of switch arms 55 and 56. Switch arm 55 is pivoted at 57 and at its other end cooperates with a holding contact 58. Switch arm 56 is similarly pivoted at 59 and cooperates with a contact 60. When relay coil 52 is energized the armature 53 is pulled to the right, thereby moving contact arms 55 and 56 into engagement with the contacts 58 and 60. Upon deenergization of relay coil 52 the switch arms 55 and 56 will be moved from engagement with contact points 58 and 60 by means of a spring, not shown.

One terminal of the valve 50 is connected by a wire 61 to line wire 62. The other terminal of said valve is connected by a wire 63 with switch arm 56 while the contact 60 cooperating with switch arm 56 is connected by a wire 64 with the line wire 65. Thus, when contact arm 56 is moved into engagement with contact 60 the valve 50 is energized and thereby caused to open for supplying gas to the burner, not shown.

The right-hand end of relay coil 52 is connected by wires 66 and 67 to the contact point 35 of the thermostat, while the other end of relay coil 52 is connected by a wire 68 with one end of the low voltage secondary 69 of a step-down transformer 70. The other end of the transformer secondary 69 is connected by a wire 71 with the contact point 34. The bimetallic element 27 is connected by a wire 72 to the holding contact 58 of relay 51 while the switch arm 55 which cooperates with holding contact 58 is connected by a wire 73 to the junction of wires 66 and 67.

In operation, as the temperature surrounding thermostatic element 27 falls, this element will warp towards the right thereby bringing contact 29 into engagement with the contact point 34. Upon a further decrease in temperature contact 31 will engage the contact point 35. An energizing circuit for the relay coil 52 will then be closed, this circuit being traced as follows: right-hand end of transformer secondary 69, wire 71, contact point 39, contact 29, bimetallic element 27, contact 31, contact point 35, wire 67, wire 66, relay coil 52, and wire 68 to the left-hand end of transformer secondary 69. Upon energization of relay coil 52 the armature 53 will move to the right, thereby bringing switch arms 55 and 56 into engagement with contact points 58 and 60. Engagement of switch arm 56 with the contact point 60 will cause energization of the gas valve 50 through wire 64, contact 60, switch arm 56, wire 63, valve 50 and wire 61 to the line wire 62.

Engagement of switch arm 55 with the contact point 58 will complete a holding circuit for relay coil 52, this holding circuit being traced as follows: transformer secondary 69, wire 71, contact point 34, contact 29, thermostatic element 27, wire 72, contact point 58, switch arm 55, wire 73, wire 66, relay coil 52 and wire 68 back to transformer secondary 69. This holding circuit shunts out the portion of the initial energizing circuit passing through contact 31 and contact point 35. Upon an increase in temperature the thermostatic element will swing to the left, first disengaging contacts 31 and 35, and upon a further increase in temperature will disengage contacts 29 and 34. Due to the holding circuit previously mentioned, when contact 31 is disengaged from the contact point 35 the relay coil 52 will continue to be energized and will remain energized until the temperature surrounding element 27 is sufficient to cause contact 29 to be disengaged from contact point 34. When this occurs the armature 53 and the switch arms 55 and 56 will be moved to the left, thereby breaking the valve opening circuit and also the holding circuit.

The heating element 19 is preferably energized by low voltage current. Therefore, one end of element 19 is connected by a wire 75 to one end of the secondary 69 of transformer 70. The other end of the heating element 19 is connected by a wire 76 to a rheostat 77, this rheostat in turn being connected by a wire 78 to the other end of the transformer secondary 69. By adjusting rheostat 77 the input to the heater 19 may be varied in order to secure the desired operation from the instrument. The heating element 19 when once adjusted is thus constantly energized to maintain a constant or unvarying input of heat into the mass element 11.

In operation, the contact points 35 and 39 may be adjusted so as to open the gas valve when the temperature of the mass element 11 is, for instance, at body temperature, namely 98° F., and to cause opening of the valve at a slightly lower temperature, for instance, 96° F. The energization of the heating element will then be adjusted by the rheostat 77 so that under equilibrium conditions the heat input to the mass element 11 will exactly equal the heat loss from said element when the mass temperature is at body temperature and the conditions within the room are such that the occupants would feel comfortable. As the instrument is exposed in the room to the same conditions as surround the occupants and as the temperature of the instrument is near body temperature, the heat losses from the instrument as a whole will be substantially proportional to the heat losses from the human body. Should the temperature in the room decrease, the effect would be to increase the heat loss from the mass 11 through the water space and the porous jacket 9. As the heat input is constant, an increase in heat loss will cause a reduction in temperature of the mass element 11 and subsequently cause the thermostatic element 27 to move contacts 29 and 31 into engagement with their respective contact points 34 and 35, thereby causing the gas valve to open in order to raise the room temperature. As the room temperature rises, the heat loss from the instrument will decrease. As the heat input to the mass element 11 is constant, this reduction in heat loss will cause a rise in temperature of the mass element 11 and subsequently cause the thermostatic element 27 to effect closing of the gas valve, thereby shutting off the flow of heat to the space in which the instrument is located.

Changes of humidity will also affect the heat loss from the instrument similarly as they affect the heat loss from a human body. For instance, should the humidity decrease, the resulting increase in evaporation of moisture from the surface of the instrument will cause a reduction in temperature thereof. This reduction in temperature occurring at the surface of the instrument will cause the temperature difference between the mass element 11 and the exterior of the instrument to increase, thereby increasing the flow of heat from the mass element 11. As the heat input thereto is constant, this increase in heat loss will result in reduction in temperature of the mass element 11 to a point at which the reduced heat loss, due to the reduced temperature, just balances the heat input. If the reduction in humidity is sufficient the increased heat loss from the instrument will cause a sufficient lowering in temperature of the mass element 11 to effect operation of the thermostatic element 27 for opening the gas valve. This will cause the temperature of the room to be increased. As noted hereinbefore, the effect of temperature increase in the air surrounding the instrument is to cause a reduction in the heat loss therefrom. When the increase in temperature due to the operation of the gas burner or other heating means is sufficient to decrease the heat loss from the instrument the same amount as the decrease in humidity increased such heat loss, the heat loss will be the same as occurred before the reduction in humidity. This reduction in heat loss will cause the temperature within the mass element 11 to rise to its original value, thereby placing the heating means out of operation.

In a similar manner, an increase in humidity will cause a decrease in heat loss from the instrument due to the reduction in evaporation of moisture from the surface of the instrument caused by such increase in humidity. This decrease in heat loss will result in the temperature of the mass element 11 increasing, thereby causing the thermostatic element 27 to place the heating means out of operation. The resulting reduction in temperature within the space due to heat loss through the walls of the building, eventually will cause an increase in heat loss from the instrument to compensate for the decrease in heat loss caused by the reduction in humidity.

It is apparent, therefore, that the instrument will act to maintain a higher temperature within the room when the humidity is low and a lower temperature within the room when the humidity is high. As the instrument is maintained at approximately body temperature, the increase in heat loss from the instrument due to a decrease in humidity or temperature will be proportionate to the increase in heat loss from the human body under the same conditions. The increase in temperature maintained by the instrument due to a reduction in humidity would thus tend to maintain the same heat loss from the human body as occurred before the reduction in humidity. The instrument, therefore, acts to adjust the temperature in the room in accordance with the humidity in order to maintain the proper heat loss from a human body to maintain the space in a comfortable condition.

It is to be observed that the instrument is affected by air currents within the room in the same manner as the human body would be affected by such currents. If the space in which the instrument is located is drafty, this flow of air will cause an increase in heat loss due to the increased evaporation of moisture from the surface of the instrument and also due to conduction or convection of heat from the surface, by the moving air. The human body is of course similarly affected. Thus, in drafty conditions the increase in heat loss from the instrument will cause it to maintain a temperature within the room which is sufficient to compensate for such drafty conditions, thereby maintaining the proper heat loss from the instrument and also from the human body. Similarly, if the air in the room is extremely still, the heat loss from the instrument will be decreased, thereby causing it to maintain a lower temperature within the enclosure in order to compensate for this still air condition, thereby maintaining the proper heat loss from the human body in order to maintain the occupants comfortable.

The heat loss from the instrument is also affected by the temperature of the walls or objects within the room. For instance, should the walls of the room be colder than the exterior of the instrument, radiation of heat from the surface of the instrument to the walls will take place. This of course will increase the heat loss from the instrument, thereby decreasing the temperature of the mass element 11. Similarly, should the walls be warmer, a decrease in radiation from the surface of the instrument to the walls will take place, thereby causing a decrease in heat loss from the instrument. If objects within the room are of higher temperature than the instrument, a radiation of heat from such objects from the instrument will take place, thereby causing the temperature of the exterior of the instrument to be increased, this acting to reduce the heat loss from the instrument. It is apparent, therefore, that the instrument is affected by the resultant of the radiation thereto and therefrom. As the temperature of the instrument is maintained at approximately body temperature the effect thereupon by the temperature of the objects in the room will be proportionate to the effect on the human body caused by the same conditions. Therefore, if the radiation effects within the enclosure are such as would cause the occupants to feel warm, their effect upon the instrument will be to decrease the heat loss therefrom sufficiently to cause it to effect a decrease in room temperature sufficient to compensate for the effect of the radiation. Similarly, if the radiation of objects within the room would cause the occupants to feel cold, the effect upon the instrument will be identical, thus causing it to increase the room temperature sufficiently to compensate for such radiation conditions.

From the foregoing it should be apparent that the instrument imitates the heat loss from the human body and will act to maintain conditions within the room or enclosure such that the resulting heat loss from the human body is sufficient to cause the occupants to feel comfortable. In other words, the device is responsive to room temperature, humidity, air currents, and radiation, and the resultant effect of these factors upon the instrument is the same as their effect upon the human body.

While in the foregoing description I have described the instrument as controlling a heating device, it will be apparent that it may be also used for controlling other condition changing devices, such, for instance, as a humidity controller, a fan or a cooling means. Also it will be apparent that the thermostatic element need not be a two-position type as illustrated, but may be of the modulating type which is well known in the art. Further, while I have illustrated the heating element as being constantly energized to maintain a constant input of heat, it will be apparent that it may be energized intermittently or that the input may be varied in accordance with some given program.

In Figure 3 I have illustrated a different form of thermostat having applied thereto the radiation responsive feature appearing in Figure 1. The thermostat illustrated in this figure is intended for mounting upon the wall of a room instead of being hung from the ceiling as in the case of that of Figure 1. The thermostat comprises a base plate 80 adapted to be secured to the wall of a room or enclosure. A U-shaped thermostatic element 81 is pivotally secured to the base plate by means of an ear 83 secured to said element, and by a second ear 84 which is secured in suitable manner to the base plate 80. Ears 83 and 84 are pivotally secured together by means of a pin 85. At the upper end of the base plate 80 is mounted an adjusting device 86, this device comprising an adjusting wheel 87 mounted upon a stud shaft 88 which is rotatably secured to the base plate 80. On the side of the adjusting wheel 87 opposite from the stud shaft 88 is an adjusting cam 89 which cooperates with the upper end of the leg 90 of the U-shaped thermostatic element 81. A spring 91 is mounted between the base plate 80 and the lower end of the leg 90 of the thermostatic element. This spring urges the upper end of the leg 90 against the cam 89. By rotation of the adjusting wheel 87 the thermostatic element is thus tilted one way or the other. The shorter leg 92 of the thermostatic element 81 carries a flexible contact blade 93 having secured thereto a contact 94. The leg 92 also carries a relatively stiff contact blade 95 which carries a contact 96. Mounted opposite to the contacts 94 and 96 is a contact point carrying member 97 formed of insulating material, this member carrying an adjustable contact point 98 which cooperates with the contact 94 and also carrying an adjustable contact 99 which cooperates with the contact 96. For further details of this form of thermostat reference is made to the application of Carl G. Kronmiller et al. Serial No. 55,603 filed December 21, 1935.

A cover 100 is mounted upon the base plate 80 in any suitable manner. This cover has a front face of relatively thick heat conducting material, and at its upper and lower ends is provided with slots such as 101 for permitting the passage of air across the thermostatic element 81. At its upper end, cover 100 is recessed at 102 to receive a heating element 103. A similar recess 104 is provided in the lower portion of the cover, this recess accommodating a heating element 105. Heating elements 103 and 105 may be connected together by the leads 106. Leads 107 and 108 are connected to the other ends of each heating element and lead to suitable binding posts 109.

This thermostat may be wired in a manner illustrated in Figure 2, that is, the heating elements 103 and 105 may be constantly energized to maintain a constant input of heat to the cover 100. As the heating elements 103 and 105 are in good heat conductive relationship with the cover or mass element 100, the temperature of the mass 100 will be substantially equal to the temperature of the heating element. By this arrangement the temperature of the cover or mass element 100 may be maintained above room temperature, thereby causing this cover to radiate heat to the surrounding objects. The cover 100 is preferably given a black surface in order that it may readily radiate heat to the objects within the room, or absorb heat from objects of higher temperature.

In operation the energization of heating elements 103 and 105 may be controlled to give the desired amount of heat input to the cover or mass element 100. The position of the adjusting wheel 87 will then be adjusted so that the thermostatic element causes engagement with or separation of the cooperating contacts at a temperature sufficiently above room temperature as to compensate for the effect of the heating of the cover or mass element 100. In other words, due to the fact that the cover causes a higher temperature to exist adjacent thermostatic element 87 than exists in the room itself, the thermostatic element must be adjusted to operate at a higher temperature than room temperature. By properly adjusting the thermostatic element it can be made to open and close the contacts when the room temperature is that desired, and in this manner maintain the desired temperature. Should the walls or objects within the room be at a low temperature, radiation of heat from the cover or mass element 100 to the walls or objects will take place. As the heat input is constant the temperature of the mass element 100 will decrease. This reduction in temperature will effect the thermostatic element, thereby causing it to close the contacts and place the heating system into operation. This will result in the room temperature increasing and when the room temperature has increased to a point wherein the increased air temperature compensates for the decrease in temperature caused by increase in radiation from the mass element 100, the thermostatic element will act to place the heating system out of operation. Conversely, should the temperature of the walls or objects in the room increase, the decrease in radiation from the cover or mass element 100 will cause the temperature of said element to increase. This will act to cause the thermostatic element to swing its contacts towards the left and away from the contacts 98 and 99 even though the room temperature remains the same. Thus, before the thermostatic element 87 will cause operation of the burner the room temperature must fall to a point lower than would have been necessary but for the decrease in radiation from the cover or mass element 100.

It is therefore apparent that the provision of the heated radiating cover plate 100 will cause the control point of the thermostat to be varied in accordance with the temperature of the walls or other objects in the room or enclosure and acts to increase the temperature which will be maintained in the room when the walls or other objects are cold and to decrease the air temperature which will be maintained when such walls or objects are warmer. This thermostat, therefore, acts to compensate for the effects of the temperature of the walls or objects within the room upon human comfort.

This form of thermostat and also that illustrated in Figure 1 is of especial utility in the control of panel type heating systems wherein the heating is effected by heating the walls and ceiling of the enclosure. With such heating arrangements it is apparent that the effect of the wall temperature upon human comfort is appreciable and for proper control requires a thermostat which is responsive to radiation as well as to air temperature.

While in the embodiments of my invention illustrated in Figure 1 and in Figure 3, I have shown the mass elements as being heated by separate heating elements, it is to be understood that I do not limit myself to this. For instance, if desired the mass element may be formed of a material having good heat conducting characteristics but which offers appreciable resistance to the passage of electricity. Thus, by passing a low voltage current through the entire mass element formed of such material, the mass element itself may act as a heater. Also, while I have shown the mass elements as being relatively thick, it is to be understood that I do not limit myself to this, and that this term "mass" as appears in the following claims is not to be construed as requiring a thick or massive element. It should be further apparent that many other modifications of my invention will be apparent to those skilled in the art. For instance, different forms of moisture diffusing surfaces may be employed than that shown in Figure 1. Also it is apparent that if desired the thermostat of Figure 3 could be provided with a moisture diffusing surface. It should be further apparent that if desired the embodiment of the invention illustrated in Figure 3 could be modified so that the thermostatic element is responsive solely to the mass temperature instead of the combined action of the mass temperature and air temperature. It will be further apparent that the embodiment of the invention illustrated in Figure 1 could be modified so as to allow the room air to contact the thermostatic element as in the case of Figure 3 or the moisture diffusing cover could be eliminated. Also, it is to be understood that the invention is not limited to controlling for human comfort, and hence, other evaporating fluids than water may be used in some instances. I therefore wish to be limited only by the scope of the appended claims and the prior art.

I claim as my invention:

1. A temperature responsive control system for controlling a temperature changing means for an enclosure comprising, a hollow mass element of heat conducting material located in said enclosure and having a centrally located depression in the inner surface thereof, heating means located in said depression in intimate heat conductive relationship with said mass element for heating it substantially uniformly throughout, means for operating said heating means to supply continuously a fixed amount of heat to said mass element in sufficient quantity to maintain the temperature of the mass element above the temperature of the air in the enclosure whereby the temperature of the mass element is determined by the temperature of the air in the enclosure, by the amount of air motion in the enclosure and by the temperature of the walls of the enclosure and of objects therein, a porous enclosure for said hollow mass element and spaced therefrom, means for supplying water to the space between the porous enclosure and the hollow mass element to cause moisture to seep through the porous enclosure and evaporate on the exterior surface thereof whereby the temperature of the hollow mass element is also affected by the relative humidity in the enclosure, thermostatic means located inside of the hollow mass element and influenced substantially solely by the temperature of the mass.

2. In apparatus of the character described, a control mechanism for controlling a temperature changing means for an enclosure comprising in combination, a hollow mass element of heat conducting material located in said enclosure, heating means located within said hollow mass in intimate heat conductive relationship with said mass element for heating it substantially uniformly throughout, means for operating said heating means to supply continuously a fixed amount of heat to said mass element in sufficient quantity to maintain the temperature of the mass element above the temperature of the air in the enclosure whereby the temperature of the mass element is determined by the temperature of the air in the enclosure, by the amount of air motion in the enclosure and by the temperature of the walls of the enclosure and of objects therein, means for supplying moisture to the outside of the hollow mass element whereby said moisture evaporates on the exterior surface of the mass element so as to cause the temperature of the hollow mass element to be affected by the relative humidity in the enclosure, and thermostatic means located inside of the hollow mass element and influenced substantially solely by the temperature of the said mass element.

3. In apparatus of the character described, control mechanism for controlling a temperature changing means for an enclosure comprising in combination, a hollow mass element of heat conducting material located in said enclosure, heating means located in said hollow mass element in intimate heat conductive relationship with the element for heating it substantially uniformly throughout, means for operating said heating means to supply continuously a fixed amount of heat to said mass element in sufficient quantity to maintain the temperature of the mass element above the temperature of the air in the enclosure whereby temperature of the mass element is determined by the temperature of the air in the enclosure, by the amount of air motion in the enclosure and by the temperature of the walls of the enclosure and of objects therein, a porous enclosure for said hollow mass element and spaced therefrom, means for supplying water to the space between the porous enclosure and the hollow mass element to cause moisture to seep through the porous enclosure and evaporate on the exterior surface thereof whereby the temperature of the hollow mass element is also affected by the relative humidity in the enclosure, and thermostatic means located inside of the hollow mass element and influenced substantially solely by the temperature of the mass element.

JOHN E. HAINES.